US011959597B2

(12) United States Patent
Stevenson

(10) Patent No.: US 11,959,597 B2
(45) Date of Patent: Apr. 16, 2024

(54) PIPELINE SENSING SYSTEM

(71) Applicant: SUSTAINABLE PIPELINE SYSTEMS LTD., Aberdeen (GB)

(72) Inventor: Andrew Stevenson, Hertfordshire (GB)

(73) Assignee: SUSTAINABLE PIPELINE SYSTEMS LTD., Aberdeen (GB)

( * ) Notice: Subject to any disclaimer, the term of this patent is extended or adjusted under 35 U.S.C. 154(b) by 263 days.

(21) Appl. No.: 17/169,065

(22) Filed: Feb. 5, 2021

(65) Prior Publication Data
US 2021/0254796 A1 Aug. 19, 2021

(30) Foreign Application Priority Data
Feb. 10, 2020 (GB) ...................................... 2001768

(51) Int. Cl.
*F17D 5/06* (2006.01)
*B29C 53/78* (2006.01)
*F17D 5/00* (2006.01)

(52) U.S. Cl.
CPC ................ *F17D 5/06* (2013.01); *B29C 53/78* (2013.01); *F17D 5/005* (2013.01)

(58) Field of Classification Search
None
See application file for complete search history.

(56) References Cited

U.S. PATENT DOCUMENTS

| 4,446,892 A * | 5/1984 | Maxwell | G01M 3/045 138/104 |
| 2014/0318663 A1* | 10/2014 | Stevenson | F16L 9/045 29/428 |
| 2018/0245957 A1 | 8/2018 | Farhadiroushan et al. | |

FOREIGN PATENT DOCUMENTS

| DE | 102018103909 A1 * | 8/2019 | ............. F16L 9/121 |
| EP | 2026919 A1 | 2/2009 | |
| GB | 2433453 A | 6/2007 | |

* cited by examiner

*Primary Examiner* — Daniel S Larkin
(74) *Attorney, Agent, or Firm* — ArentFox Schiff LLP

(57) ABSTRACT

A sensor for measuring a characteristic of a length of a pipeline, wherein the sensor comprises a sensor length arranged to extend helically along the pipeline length; and the sensor length extends parallel to a ridge extending radially from a layer of a wall of the pipeline length. A length of pipeline with an integrated sensor length may be constructed by bending a first strip of material into a helical form that comprises a first ridge; bending a second strip of material into a helical form, wherein the second strip of material comprises a second ridge; forming a tubular shape from the first and second strips of material, wherein the first strip of material at least partially surrounds the second strip of material, and the first ridge engages the second ridge; and wrapping a sensor length about the tubular shape.

8 Claims, 6 Drawing Sheets

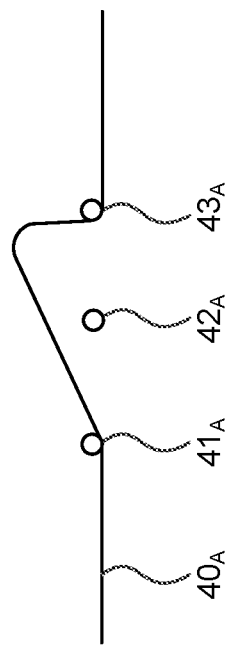
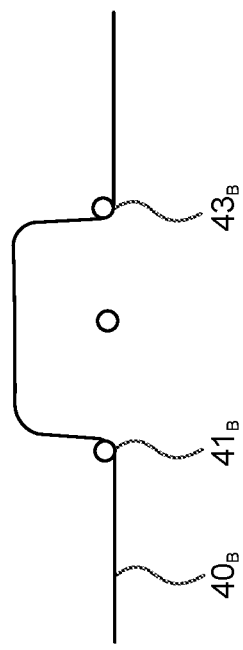
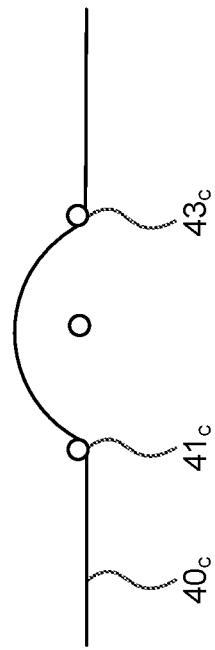
FIG. 4A
FIG. 4B
FIG. 4C

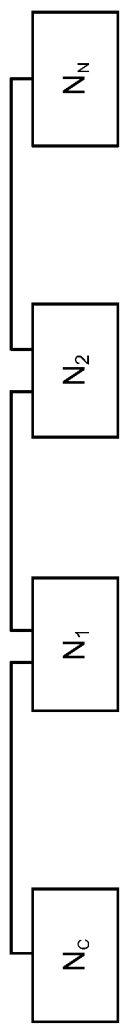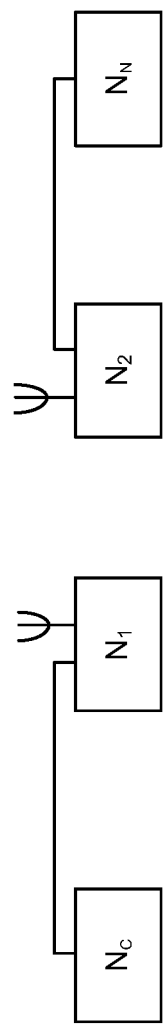

PIPELINE SENSING SYSTEM

CROSS-REFERENCE TO RELATED APPLICATIONS

This application claims priority to British Application No. 2001768.7, filed on Feb. 10, 2020. The disclosure of the priority application is incorporated in its entirety herein by reference.

BACKGROUND

Pipelines, formed from tubular bodies, can be created in many forms. Pipelines are generally used for transporting liquid or gas, for example crude oil, petroleum, water, sewage or a gas under pressure.

Pipelines are generally made of a solid material, such as steel or plastic, and the diameter, length and wall thickness depend upon the substance being transported and the relative pressures involved with transportation. The pipeline material depends upon the transported substance, for example high pressure natural gas pipelines are generally constructed of carbon steel.

A pipeline should be chemically resilient to a substance being transported and protect the substance or inner structures from external forces, such as intentional damage from sabotage, vandalism or theft, unintentional damage from ground movement or heavy machinery or gradual deterioration such as by corrosion or fatigue.

A pipeline may consist of an outer tubular form surrounding an inner tubular form. For example, an outer tubular material may be steel, and an inner pipe may be plastic. An inner layer of the outer pipe may transmit a compressive force to reinforce an outer layer of the inner pipe to enable the inner pipe to withstand a pressure acting against an inner layer of the inner pipe.

It is common to form large pipelines from smaller sections of pipe which have each been roll formed into tubular structures from a flat plate and then seam welded to form an individual smaller section of pipe. A plurality of smaller sections of pipe are butt welded to form a finished pipeline. The logistics are complex for the manufacture, storage and transportation and assembly of such pipe sections for butt welding into larger pipelines. Further complications are added when individual pipe sections must be bent in order for the pipeline to adhere to a predetermined route or to lie on undulating terrain.

FIGS. 1 and 2 are schematic longitudinal views, partially cut-away and partially in section, of sections of pipeline that form part of the prior art. The sections of pipeline are helically wound tubular structures that may be manufactured by processes described in GB 2433453 B. The patent describes that a rotating faceplate upon which are mounted a plurality of diameter defining rollers which, in operation, cause a strip material to be plastically deformed into a helical winding which may be lain down in abutting or self-overlapping relationship to form tubular structures.

The sections of the pipelines 1, 2 illustrated in FIGS. 1 and 2 are characterised by ridges 10, 20 formed on their exterior surfaces. The ridges permeate through multiple layers of helically wound strip materials and provide an interlock between adjacent layers of the strip material. An advantage of forming a pipeline from lengths of helically wound tubular structures is that the pipeline can be manufactured and laid in situ, which reduces costs associated with constructing of the pipeline in comparison to a pipeline formed from numerous short sections of butt welded pipes described above.

The interlocks in the pipeline 1 of FIG. 1 have a different profile for each layer. An outer layer 10 interlock has a peak with a large radius, while an inner layer interlock has a peak with a smaller radius in order to provide improved interlocking between the inner and outer layers as the inner interlock 10 fits within the outer interlock. The ridges of both layers are symmetrical about a longitudinal axis $X_1$ of the pipeline 1.

The interlocks in the pipeline 2 of FIG. 2 has a different profile on each layer with an interlock of an inner layer being smaller than an interlock of an outer layer. In contrast to the interlocks 10 of the pipeline 1 of FIG. 1, the interlocks 20 of the pipeline 2 of FIG. 2 are asymmetrical about a longitudinal axis $X_2$ of the pipeline 2. Each interlock 20 of the pipeline 2 of FIG. 2 has two slopes of different lengths that extend from a plane parallel to the longitudinal axis $X_2$ of the pipeline 2, with one slope 21 at a greater angle relative to the plane than the other slope 22. In FIG. 2, each outer and inner helically wound strip material is formed with two interlocks per strip.

The exemplary pipe in FIG. 2 consists of two layers of helically wound strips, but it is known to helically form additional layers of strip metal to provide additional reinforcement for a pipe wall. Specifically, the degree of reinforcement is in proportion to the aggregate total thickness of reinforcing strip layers and their strengths.

Two examples of helically wound pipelines that form part of the prior art are discussed above and are illustrated in FIGS. 1 and 2. However, the vast majority of pipelines worldwide are solid tubular pipes that are butt-connected on-site and are formed from steel or plastic.

SUMMARY

According to a first aspect there is provided a sensor for measuring a characteristic of a length of a pipeline, wherein the sensor comprises a sensor length arranged to extend helically along the pipeline length; and the sensor length extends parallel to a ridge extending radially from a layer of a wall of the pipeline length.

The ridge may comprise an engagement between a plurality of layers of the wall of the pipeline length. The plurality of layers may comprise an outer layer and an inner layer that extend helically along a longitudinal axis of the pipeline length. The sensor length may be arranged to abut the ridge. The sensor length may by arranged to be contained within a cavity positioned between the ridge and a longitudinal axis of the pipeline length. The measured characteristic may be a presence of hydrogen gas and/or a strain of the wall of the pipeline. The layer may comprise a helically formed strip of material; the ridge may be a first ridge; the strip of material may comprise the first ridge and a second ridge; and the sensor length may be between the first ridge and the second ridge, or the sensor length may be proximal to an edge of the strip and distal to both the first ridge and the second ridge. The sensor length may be a first sensor length and the sensor may further comprise at least one additional sensor length that extends parallel to the ridge. The length of the pipeline may comprise a first length of the pipeline and a second length of the pipeline; the first sensor length may extend around the first and second lengths of the pipeline; and the second sensor length may extend around the first length of the pipeline and not the second length of the pipeline.

According to a second aspect there is provided system comprising the sensor and a pipeline.

According to a third aspect there is provided method for constructing a length of pipeline with an integrated sensor length. The method comprises bending a first piece of strip material into a helical form that comprises a first ridge; and bending a second piece of strip material into a helical form, wherein the second strip of material comprises a second ridge; forming a tubular shape from the first and second strips of material, wherein the first strip of material at least partially surrounds the second strip of material, and the first ridge engages the second ridge; and wrapping a sensor length about the tubular shape.

The sensor length may be wrapped about the tubular shape at a predetermined distance from the engagement between the first ridge and the second ridge. The sensor length may be wrapped about the ridge of the first strip of material. The sensor length may be a first sensor length and the method may further comprise wrapping a second sensor length about the tubular shape, wherein the first and second sensor lengths may be wrapped simultaneously. The second sensor length may be wrapped about the tubular shape at a second predetermined distance from the engagement between the first ridge and the second ridge and wherein the first predetermined distance is different to the second predetermined distance. The engagement between the first ridge and the second ridge may provide an interlock operable to resist axial expansion of the length of pipeline. Each of the first and second strips of material may be bent to form two or more ridges; and the sensor length is be wrapped around the first strip of material between two ridges, or the sensor length is wrapped around the first strip of material between the ridges and an edge of the strip. The method may further comprise wrapping an outer layer around the pipe shape.

According to a fourth aspect there is provided length of pipeline constructed using the aforementioned method.

According to a fifth aspect there is provided a pipeline construction machine arranged to manufacture a length of pipeline according the aforementioned method.

DESCRIPTION OF THE DRAWINGS

FIGS. 4A-C illustrate examples of different ridge formations.

FIGS. 6A-C illustrate exemplary arrangements of sensor nodes and their respective connections.

DESCRIPTION OF THE INVENTION

Figure 3A:
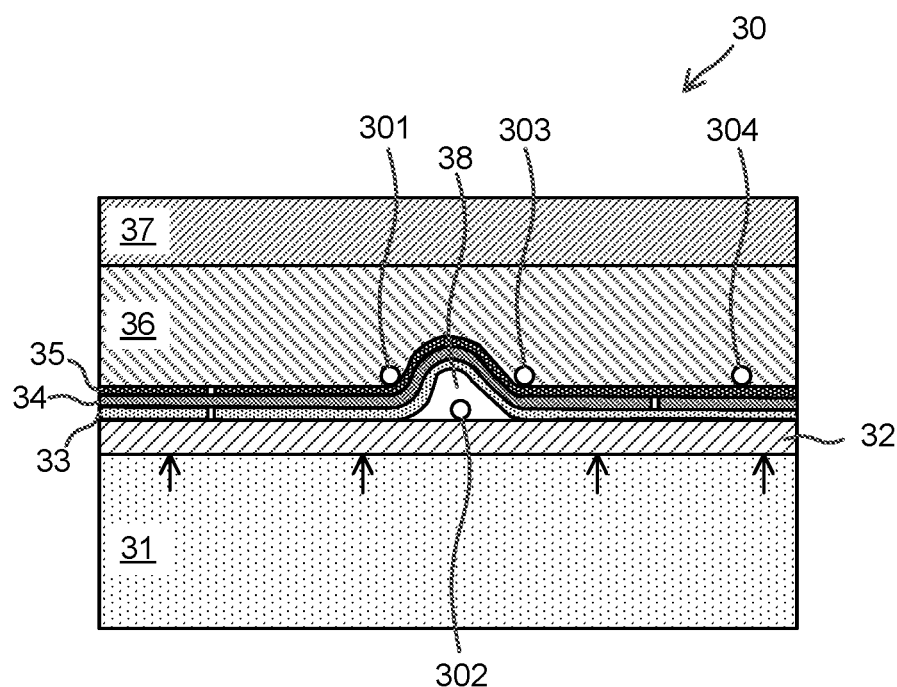
FIG. 3A is a cut-away view of a section of pipe according to one example

FIG. 3A is a cut-away view of a section of pipe according to an example. Specifically, the figure illustrates a section of a pipe 30 comprising helically formed pipe layers. The helically formed pipe layers are formed from three individual layers 33, 34, 35 of strip material (an inner strip material 33, a middle strip material 34 and an outer strip material 35) that each are formed with a ridge to provide an interlocking portion that, by way of an interference fit, adds structural integrity to the pipe wall.

Moving from the helically formed pipe layers 33, 34, 35 towards a longitudinal axis of the pipe (downwards in FIG. 3A), there is a liner pipe 32 that functions as a pipe liner. The liner pipe 32 provides fluid tightness to the pipe 30 and chemical resistance to fluid being transported within the pipe. The liner pipe 32 may be formed from a plastic material, such as high-density polyethylene (HDPE), polyvinylidene fluoride (PVDF) or the like, or a corrosion resistant alloy. The pipe 30 as illustrated is transporting a fluid 31 that is exerting a pressure against the liner pipe 32, represented by the four parallel arrows in the figure. The pressure may be constant, but may also steadily increase, decrease or fluctuate in response to thermal contraction, thermal expansion, pumping, deflation due to escape of the fluid 31, or external forces creating movement of the pipe 30. The liner pipe 32 provides fluid tightness but may allow gas to permeate through the liner pipe 32 from the fluid 31. For example, if pressurised hydrogen is being transported through the pipe 30, hydrogen molecules may permeate though the liner pipe 32, accumulating a small amount of hydrogen gas outside the liner pipe 32. A venting mechanism can be provided by the cavity formed by a ridge of the helical inner pipe layer 33 whereby gas accumulating within the pipe can vent or be captured through an end fitting at an end of a section of pipe. This is an advantageous feature as it is undesirable for gas to escape in an uncontrolled manner from the pipe and the venting mechanism, including a venting channel formed by the cavity, provides a reliable means of quickly sensing an accumulation of a gas, e.g. hydrogen gas, within a section of pipeline.

Moving from the helically formed pipe layers 33, 34, 35 and away from a longitudinal axis of the pipe (upwards in FIG. 3A), an inner coating 36 is applied to the helically wound strips to form a protective layer. The inner coating 36 can be a material wound around the outer helically formed pipe layer 35 and may be a plastic material that is compressible in order to protect inner constituent parts of the pipe 30 from external forces and shocks. Surrounding the inner coating 36 is an outer coating 37, which may be formed of a material harder than the inner coating 36 in order to protect the pipe 30 from incidental or purposeful external abrasions and may be referred to as a scuff coating. The outer coating also benefits the pipe 30 by protecting against moisture ingress. The outer coating 37 may be known as an outer environmental layer and, in one example, is formed from a tape applied by winding, and in a second example, it is a particulate or solution applied by a spray or a painting process.

Figure 1:
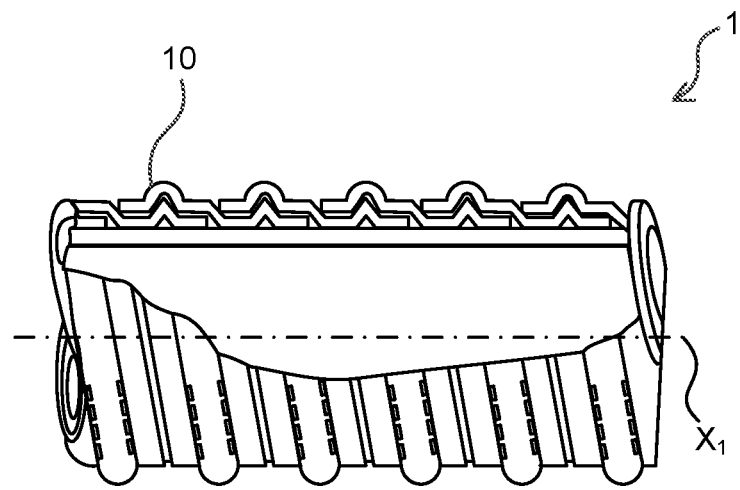
FIG. 1 is a schematic longitudinal view, partially cut-away and partially in section, of a tubular member that forms part of the prior art.
Figure 2:
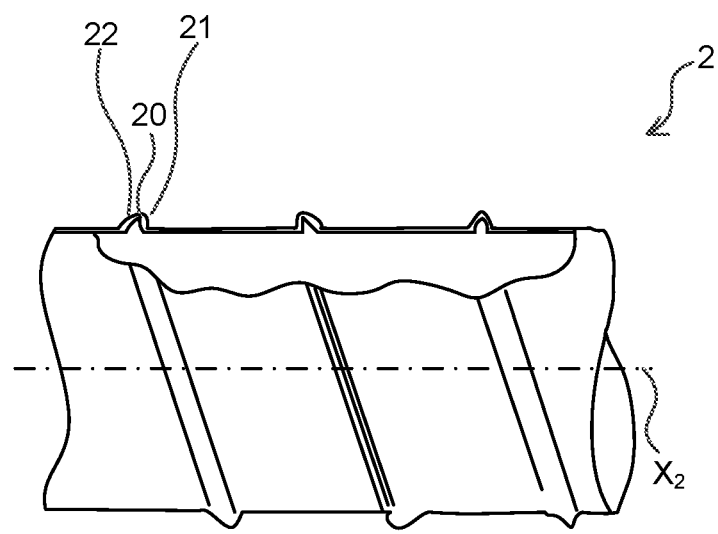
FIG. 2 is a schematic longitudinal view, partially cut-away and partially in section, of a tubular member that forms part of the prior art.

The three respective ridges of the helically formed pipe layers 33, 34, 35 are formed to enable mechanical interlocking of the layers and are illustrated in FIG. 3A to form a shape similar to that illustrated in FIG. 2. It will be apparent that other interlocking shapes can be used other than that illustrated in FIG. 3A and this is discussed below in relation to FIG. 4.

During manufacture of the pipe 30 illustrated in FIG. 3A, strip metal is formed into a helical shape with at least one ridge running down the length of the strip, and the ridge forms part of the interlocking portion illustrated in FIG. 3A. A length of sensor material, hereinafter "a sensor length", is wrapped around the pipe 30 during manufacture prior to a coating layer, such as the inner coating 36 and/or the outer coating 37 being applied. The sensor length may be a length of optical fibre, two or more optical fibres, an electrically resistive material, or any other sensing material able to react to the measured characteristics in a way that permits data collection and data aggregation for one or more lengths of pipe. Manufacturing the pipe 30 while simultaneously embedding one or more sensor lengths provides a more efficient manufacturing process and is more efficient than laying of a sensor, such as an optical fibre, next to a pipeline that has already been installed. Further, it will be apparent that embedding a sensor length within the pipe 30 during manufacture provides additional sensing options and configurations. The pipe 30 is illustrated with four sensor lengths 301, 302, 303, 304 shown in cross-section. The sensor lengths are helically wrapped around selected layers of the pipe and the angle of each sensor length relative to a longitudinal axis of the pipe corresponds with the angle of the ridge relative to the longitudinal axis of the pipe. A first sensor length 301 is illustrated being proximal to a first base of the ridge of the helical outer pipe layer 35. A second sensor length 302 is illustrated within a cavity 38 formed by a ridge of the helical inner pipe layer 33. Specifically, the cavity is bounded by the helical inner pipe layer 33 and the liner pipe 32. A third sensor length 303 is illustrated proximal to a second base of the ridge of the outer pipe layer 35. A fourth sensor length 304 is illustrated distal to the ridge of the outer pipe layer 35 and is laid against a portion of the outer pipe layer 35 that is parallel with the longitudinal axis of the pipe. The position of each sensor length 301, 302, 303, 304 enables specific sensing capabilities by measuring characteristics of specific parts of the pipe 30.

The first sensor length 301, positioned proximal to, adjacent, abutting or close to a first base of the ridge of the outer pipe layer 35, is advantageous as the first base of the ridge of the outer pipe layer 35 is the steepest curve of the ridge relative to the generally flat outer pipe layer surface, which means the manufacturing of a pipe with a sensor length in this position is more reliable as the sensor length is better retained in place by during the manufacturing (winding) process by (very light) tension along its length acting against the ridge of the outer pipe layer 35. This increased manufacturing reliability allows an increased speed of manufacture and a decreased wastage of materials. Stresses in the pipe 30 may be amplified in the helical shaped ridge that extends along the pipe 30 and the position of the first sensor length 301, proximal to or abutting the steep angle of the ridge of the outer pipe layer 35 ensure good sensing of stress patterns. The steep angle between the ridge and the flat section of the outer pipe layer 35 enable the sensor length to better detect changes in strain in the helically formed pipe layers 33, 34, 35. Stresses in the helically formed pipe layers 33, 34, 35 may be caused by changes in internal pressure of the fluid 31 within the liner pipe 32, thermal expansion or contraction in any of the layers of the pipe 30, external forces to the outer coating 37 or the like.

The second sensor length 302, within the cavity is bounded by the inner pipe layer 33 and the liner pipe 32, is positioned proximal to, adjacent, abutting or close to the liner pipe 32. The second sensor length 302 may be positioned to contact the inner helically formed pipe layer 33. The second sensor length 302 is responsive to physical changes relating to the liner pipe 32, for example, the temperature, the physical movement or chemical changes relating thereto, or the like. Chemical changes include leakage of fluid 31 from a damaged section of the liner pipe 32, leakage of a substance from outside the pipe due to either damage or a manufacturing defect of the pipe 30, permeation of material through the liner pipe 32 or the like. A previous example stated that the fluid 31 may include hydrogen and that hydrogen gas may permeate through the liner pipe 32. Hydrogen gas would increase in concentration within the cavity that contains the second sensor length 302. The sensor length is responsive to chemical changes, for example a sensor length comprising an optical fibre can detect the present of hydrogen as the scattering of light transmitted along the optical fibre is affected and this change in scattering can be detected; or a sensor length may comprise an electrically conductive length with one or more chemical sensors positioned along its length. The second sensor length 302 is highly responsive to changes in conditions of the liner pipe 32 due to the proximity.

The third sensor length 303, proximal to, adjacent, close or abutting the second base of the ridge of the outer pipe layer 35 has advantages shared with the first sensor length relating to increased manufacturing efficiency and improved detection of stresses in a helically formed pipe layer.

A fourth sensor length 304, distal to the ridge of the outer pipe layer 35 and at a flat portion of the outer pipe layer 35, can better detect transient signals or vibrations that are conducted down the length of one or more components of the pipe 30, i.e. transmitted along the pipe 30. The first 301, third 303 and fourth 304 sensor lengths all provide an averaged response to all the pipe layers 33, 34, 35, including the liner pipe 32.

In summary, the first and third sensor lengths 301, 303 are proximal to and extend parallel to the ridge and can detect stress and strain patterns that are more evident at the ridge as the ridge is a stress point for the pipe 30. The second sensor length 302 may better respond to internal variations in flow or pressure relating to fluid 31 being transported within the pipe 30 whereby steady state stress changes in the liner pipe 32 and transient elastic ringing of the liner pipe 32 is detectable. The fourth sensor length 304 may better responds to external events outside the pipe 30 wall, such as ground movement, vibration, impact force, water ingress, thermal change or the like. All the sensor lengths respond to material changes within the pipe 30 structure such as corrosion, softening, hardening or crack initiation in fatigue or the like, but may respond in different ways allowing diagnosis of such events.

The four sensor lengths 301, 302, 303, 304 are above described in isolation; however, sensing of the pipe 30 is further increased if multiple sensor lengths are laid into the pipe 30 during manufacture. In one example, multiple sensor lengths may be helically laid within the pipe during manufacture and, post manufacture, one or more of the sensor lengths are connected to a sensor system dependent upon what characteristics of the pipe are to be measured. In one example, not illustrated, one or more of the four sensor lengths 301, 302, 303, 304 is comprised from two or more lengths of optical fibre.

Conditions of the pipe 30 can be even better diagnosed by implementing a plurality of the four sensor lengths 301, 302, 303, 304 as signals detected by respective sensor lengths can be compared and contrasted to better diagnose conditions within or affecting the pipe 30. For example, a pipe 30 with a second sensor length 302 in combination with any of the first 301, third 303 or fourth 304 sensor lengths can better detect relative expansion of layers of the pipe 30 as the second sensor length 302 can better detect specific changes in the structure of the liner pipe 302 as it is in proximity to it, while another of the sensor lengths may better detect changes to a respectively more outer layer of the pipe 30.

Figure 3B:
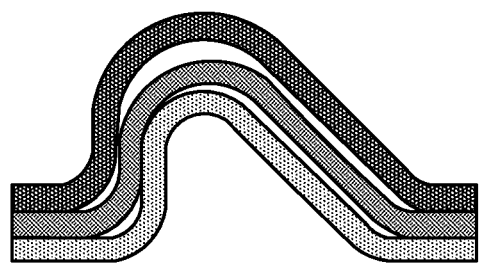
FIG. 3B illustrates a detailed view of an example of a ridge in FIG. 3A.

FIG. 3B illustrates a detailed view of an example of a ridge according to FIG. 3A. The three pipe layers 33, 34, 35 that comprise the ridge are shown in greater detail and provide a more detailed view of the interlocking of the pipe layers 33, 34, 35 of FIG. 3A. The invention is applicable with pipes formed from two or more pipe layers and the number of pipe layers illustrated in any figure purely exemplary and not intended to restrict the number of pipe layers that interlock using a ridge.

Figure 3C:
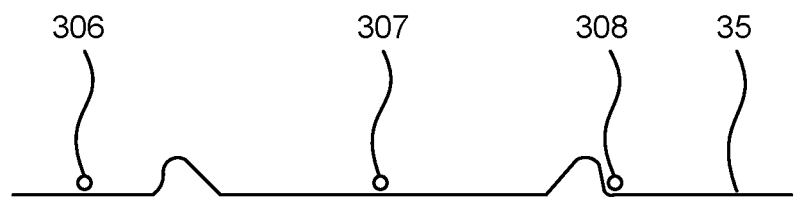
FIG. 3C illustrates an exemplary section of an outer helically formed pipe wall.

FIG. 3C illustrates an exemplary cross-section of a strip that forms an outer helically formed pipe layer 35. In this example, the layer 35 comprises two ridges that are symmetrical about a mid-point of the strip that forms the layer 35. The steeper angle of each of the two ridges are distal and the shallow angles of the two ridges are proximal. The cross-section of the strip comprises (from left to right in the figure) a first edge of the strip, a first edge-straight section, a first ridge, a mid-straight section, a second ridge, a second edge-straight section and a second edge of the strip. The mid-straight section is disposed between the two ridges. Three sensor lengths 306, 307, 308 are provided in FIG. 3C to illustrate three positions that sensor lengths can be placed. A first sensor length 306 is positioned on the first edge-straight section, which may be more generally referred to as an edge-straight section of the strip. A second sensor length 307 is positioned on the mid-straight section, which may be more generally referred to as a mid-ridge section of the outer layer 35. A third sensor length 308 is positioned against an outer side of the second ridge.

The position each of the three sensor lengths provides a distinct advantage. The position of an edge-straight sensor length 306 can better detect an expansion of a respectively inner pipe layer that may correspond to a change in the pressure of fluid inside a pipeline. The position of a mid-ridge sensor length 307 can better detect transient signals that propagate along a central axis of a pipeline. The position of the mid-ridge sensor length 307 can better detect deformities of a ridge that provides an interlock between pipe layers that form a pipeline.

A pipeline can include any combination of the sensor lengths illustrated in FIGS. 3A and 3C.

FIGS. 4A-C illustrate examples of three different ridge profiles $40_A$, $40_B$, $40_C$ that can be formed in a helically formed pipe layer. Only a single ridge profile is shown in each figure, however the ridge profile of different layers will differ slightly to ensure a good interference fit between the layers.

FIG. 4A illustrates a profile that is similar to that illustrated in FIG. 2. A first sensor length $41_A$ is positioned at a shallow portion of a slope of the pipe layer, a second sensor length $42_A$ is positioned in a cavity below the pipe layer, and a third sensor length $43_A$ is positioned at a steep portion of a slope of the pipe layer $40_A$.

FIG. 4B illustrates a square ridge shape where first $41_B$ and third $43_B$ sensor lengths are positioned by equally steep portions of a pipe layer $40_B$.

FIG. 4C illustrates a curved ridge shape where first $41_C$ and third $43_C$ sensor lengths are positioned by equally shallow portions of a pipe layer $40_C$.

Figure 5:
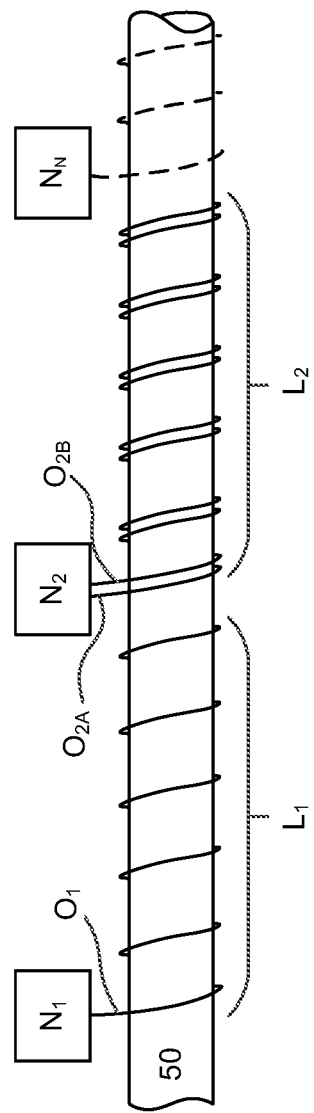
FIG. 5 is an exemplary pipeline sensing system.

FIG. 5 illustrates a schematic of an exemplary pipeline sensing system. A pipe 50 is shown in a simplified form with ridges and outer layers excluded. Sensor lengths are shown extending helically along the pipe 50. Each sensor length $O_1, O_{2A}, O_{2B}$ is coupled to a sensor node $N_1, N_2 \ldots N_n$. FIG. 5 illustrates a limited portion of the total pipe length and there would be additional sensor lengths and sensor nodes along the length of the pipe 50. In one example, each sensor length is a length of optical fibre and a respective sensor node is arranged to transmit light down the optical fibre and to detect subsequent backscatter that corresponds to a condition of the fibre along its length. In the illustrated example, a first sensor node $N_i$ is coupled to one sensor length $O_1$, while a second sensor node $N_2$ is coupled to two sensor lengths $O_{2A}, O_{2B}$. The two sensor lengths $O_{2A}, O_{2B}$ may, for example, be any combination of the four sensor lengths illustrated in FIG. 3A. More than two sensor lengths may be coupled to a single sensor node. Each sensor node gathers data for a specific length $L_1, L_2$ of the pipe 50. A sensor node is arranged to, using a signal processing unit, process information collected from each coupled sensor length and then share resultant processed data to a control node as described below in relation to FIGS. 6A-6C. Backscatter information may be processed locally in sensor nodes as described above and, optically, transmitted to a remote location for storage and further processing.

FIGS. 6A-6C illustrate three examples of how separate sensor nodes $N_1, N_2, N_n$ are coupled together and how they share information about a specific sensor length.

FIG. 6A illustrates a first example whereby sensor nodes $N_1, N_2, N_n$ are coupled together via a common link, or backbone. The common link may be a length of optical fibre that extends down the length of the pipeline in a non-helical pattern. Each sensor node transmits processed data relating to information collected from a coupled sensor length down the common link to a control node $N_c$, which receives the processed sensor data.

FIG. 6B illustrates a second example whereby sensor nodes $N_1, N_2, N_n$ are coupled together via a switched network, whereby data from an end sensor node $N_n$ is relayed by other sensor nodes $N_1, N_2$ until the processed sensor data reaches a control node. This example may utilise an Ethernet switched network.

FIG. 6C illustrates a third example whereby a number of sensor nodes $N_2, N_n$ are coupled together via a common link or switched network, and then coupled to a control node $N_c$ either directly or indirectly via a wireless link, such as a cellular connection. Alternatively or additionally, a series of nodes include one or more resilient data recorders that record raw data for a section of a pipeline. The raw data can be accessed remotely over a network or accessed locally. In one example, each sensor node has an individual resilient raw data recorder and first level data analyser.

In some examples, data connections between sensor nodes use additional cables laid along a pipeline. In other examples, data connections may utilise pre-existing data communication infrastructure. In yet another example, data is transmitted between sensor nodes using infrastructure that is helically wound around the pipe during construction of the pipe using the same process manner as helically wound sensor lengths. This example may involve a bundle of optical fibres being helically wrapped around a pipe during construction and one or more fibre lengths that form the bundle being used for data transmitted along the pipeline.

Figure 7:
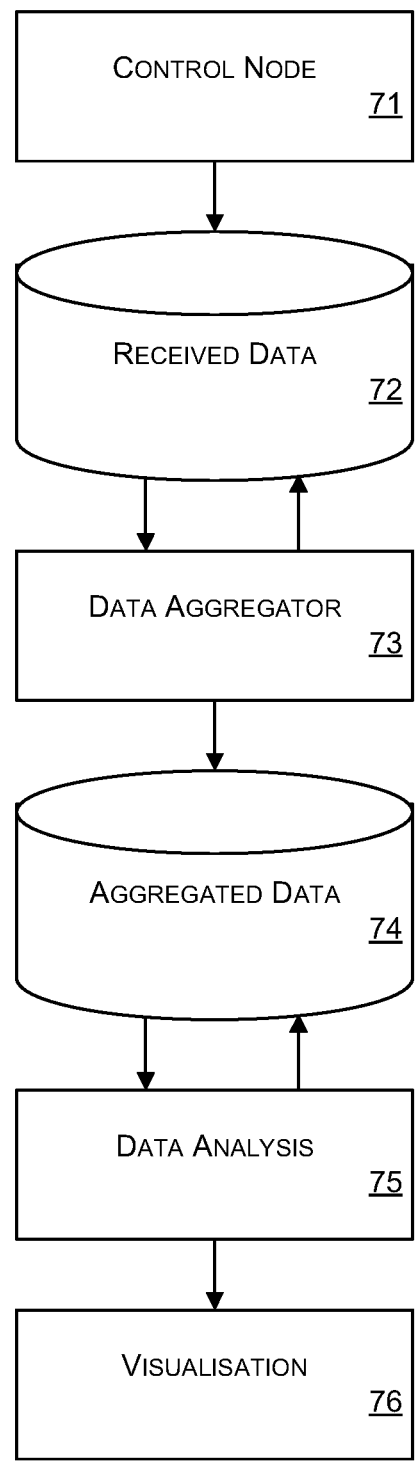
FIG. 7 is a schematic diagram of a data collection, analysis and visualisation system.

FIG. 7 illustrates an exemplary data collection, analysis and visualisation system. Information about a pipe collected by sensor lengths surrounding the pipe is received by a sensor node. The sensor node processes the received information and transmits this processed information to a Control Node 71. The Control Node 71 stores the received data in a Receive Data store 72. A Data Aggregator 73 is operable to retrieve the received data (relating to individual sensor nodes) and aggregate the data, storing it in an Aggregated Data store 74. Each Control Node 71 can store data locally or transmit the data to a central Received Data store 72.

Aggregated data may relate to an entire pipeline or a length larger than that covered by a single sensor length. The Data Analysis 75 block models the data, comparing it to a number of pre-existing models in order to identify if any known events correspond to information collected from a pipeline that is being measured. Visualisation 76 block includes a software module that provides screen views of insights to one or more users. Visualisation dashboards can be configured to represent one or more pipelines and present optimum insights a specific user. In one example, a pre-existing model is produced from data collected when a pipeline is constructed and changes to the pipeline, determined from detected changes in strain at a point in the pipeline, leads to an alert being generated that prompts manual inspection of the point in the pipeline. This pro-active inspection of a point of a pipeline is preferable to general inspection regimens of the length of a pipeline that are known from the prior art. In another example, a model may relate to a period of time and therefore a stress/strain pattern of a pipeline over a period of time is modelled, e.g. one day. Over the day, the pipeline may have regular stresses applied due to repeated pressurisation of fluid within the pipeline that corresponding to normal use of the pipeline. In a further example, collected data is used to provide an estimated lifetime of a section of a pipeline, whereby detected strains of a section of the pipeline over the lifetime of the pipeline are compared to a predetermined amount, i.e. a specific number of fatigue cycles.

In one example, a user can select to view a single sensor length, which may be a single optical fibre. The sensor length is divided into 200 channels, each channel representing 0.15 meters of a pipe being monitored. A waterfall display provided by the Visualisation 76 block allows events relating to in any channel to be seen in real time and visualised on a connected display. Such a system may provide an early warning system in the event of abnormal state of a section of a pipeline, including, but not limited to third party intrusion. In another example, Received Data 72 is analysed to identify changes in stresses and strains of a pipe section measured by a sensor length caused by cyclic internal pressure changes within the pipe section. The analysed data is operated on using a fracture mechanics algorithm or a strain intensity algorithm. Visualisation 76 module can provide information for an expected residual life of relative sections of a pipeline being measured.

Data Analysis 75 can selectively conduct a finite element model of a stress distribution pattern around a section of pipe to aid diagnosis of pipe conditions. The Data Analysis 75 module can automatically alert a user to an abnormal stress distribution pattern in a section of pipe indicating early onset of a potential or actual failure mechanism. Alternatively or additionally, Data Analysis 75 module compares Received Data 72 to pre-existing data model(s) that correspond to pipeline condition(s) and the status of a section of pipeline is categorised based upon the result of the comparing step. Such analysis may include an algorithm that can refer to the fatigue life curve of the material and thereby provide a predictive element to the data analysis output.

The system illustrated in FIG. 7 is operable to detect and/or measure:

(a) stress or strain changes in a reinforcement layer or any other part of a pipe wall due to changes in the internal pressure of fluid flowing through the pipe;

(b) thinning or chemical modification to a strip material (or other part of the pipe) due to corrosion or any form of chemical interaction changing the elastic properties of a layer, modification in elastic or plastic properties due to fatigue, such as work hardening, fatigue, crack initiation or crack growth;

(c) elastic vibrational response, such as ringing, that creates a specific signature arising, for example Rayleigh waves, due to an external transient disturbance, such as approach of a vehicle, interference by any means such as drilling, vandalism etc.;

(d) gradual change in a stress pattern arising from distortions or bending of a pipe, for example due to sagging of an above ground pipe between supports, thermal expansion and contraction of a buried pipe, movement of a buried pie due to ground movement such as subsidence;

(e) temperature change in a layer of the pipe, for example due to leakage, thermal fluctuation, adiabatic effects, etc.; and (f) presence of any gas or liquid within a wall of the pipe, for example the presence of hydrogen gas due to permeation, or the presence of a hydrocarbon due to diffusion that arises from permeation, diffusion or leakage of the fluid being contained within the pipe.

Although the present invention has been described in connection with examples or embodiments, it is not intended to be limited to the specific form set forth herein. Rather, the scope of the present invention is limited only by the accompanying claims. Additionally, although a feature may appear to be described in connection with particular examples or embodiments, one skilled in the art would recognize that various features of the described examples or embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A pipeline system comprising a pipeline length and a sensor for measuring a characteristic of the pipeline length;
   the pipeline length comprising a pipeline wall, the pipeline wall comprising a plurality of layers, the plurality of layers of the pipeline wall forming a ridge, the plurality of pipeline layers engaging at the ridge, the ridge extending radially outwardly from an exterior surface of the pipeline wall, and the ridge extending helically along the pipeline length; and
   the sensor comprising a sensor length extending helically along the pipeline length, the sensor length extending helically around an outside of the pipeline length parallel to the helical ridge, the sensor length abutting the ridge at the exterior surface of the pipeline wall outside of the pipeline length, and the sensor length being an optical fibre; wherein
   the measured characteristic by the sensor is a presence of a strain of the wall of the pipeline length.

2. The pipeline system of claim 1, wherein the plurality of layers of the pipeline length comprises an outer layer and an inner layer that extend helically along a longitudinal axis of the pipeline length.

3. The pipeline system of claim 1, wherein
the layer comprises a helically formed strip of material;
the ridge is a first ridge;
the strip of material comprises the first ridge and a second ridge; and
the sensor length is between the first ridge and the second ridge, or
the sensor length is proximal to an edge of the strip and distal to both the first ridge and the second ridge.

4. The pipeline system of claim 1, wherein
the sensor length is a first sensor length; and
the sensor further comprises at least one additional sensor length that extends parallel to the ridge.

5. The pipeline system of claim 4, wherein the additional sensor length is arranged to be contained within a cavity positioned between the ridge and a longitudinal axis of the pipeline length.

6. The pipeline system of claim 5, wherein the additional sensor length is an optical fibre, a measured characteristic of the additional sensor length is a presence of hydrogen gas within the cavity, and the measured characteristic is provided by monitoring a light scattering characteristic of additional sensor length optical fibre.

7. The pipeline system of claim 4, wherein
the length of the pipeline comprises a first length of the pipeline and a second length of the pipeline;
the first sensor length extends around the first and second lengths of the pipeline; and
the second sensor length extends around the first length of the pipeline and not the second length of the pipeline.

8. The pipeline system of claim 1, wherein the pipeline further comprises a liner pipe inside the pipeline wall and the sensor is outside the pipeline wall.

* * * * *